(12) United States Patent
Persha

(10) Patent No.: US 6,327,081 B1
(45) Date of Patent: Dec. 4, 2001

(54) TEMPERATURE COMPENSATING FOCUSER FOR TELESCOPE

(75) Inventor: Gerald C. Persha, Lowell, MI (US)

(73) Assignee: OPTEC, Inc., Lowell, MI (US)

( * ) Notice: Subject to any disclaimer, the term of this patent is extended or adjusted under 35 U.S.C. 154(b) by 0 days.

(21) Appl. No.: 09/567,459

(22) Filed: May 8, 2000

(51) Int. Cl.$^7$ .................................................. G02B 23/00
(52) U.S. Cl. ............................................ 359/425; 359/820
(58) Field of Search ..................................... 359/399, 425, 359/819, 820

(56) References Cited

U.S. PATENT DOCUMENTS

| | | |
|---|---|---|
| 3,279,309 | 10/1966 | Goldberg . |
| 4,190,325 * | 2/1980 | Moreno . |
| 4,772,912 | 9/1988 | Ishida et al. . |
| 4,776,684 | 10/1988 | Schmidt-Kaler . |
| 4,919,519 * | 4/1990 | Fantozzi et al. . |
| 4,982,216 | 1/1991 | Kudo et al. . |
| 5,124,738 | 6/1992 | Yamashita . |
| 5,412,448 | 5/1995 | Kunishige . |
| 5,412,510 | 5/1995 | Iizuka et al. . |
| 5,504,628 * | 4/1996 | Borchard .............................. 359/796 |
| 5,570,238 | 10/1996 | Leary . |
| 5,623,138 | 4/1997 | Lee . |
| 5,856,664 | 1/1999 | Suzuki et al. . |
| 5,936,717 | 8/1999 | Viola . |
| 5,995,766 | 11/1999 | Yamashita . |
| 6,012,376 * | 1/2000 | Hanke et al. ........................ 89/41.19 |

OTHER PUBLICATIONS

Cox, R. E. and Sinnott, R. W., "Gleanings for ATM's—The Crayford Eyepiece Mounting," *Sky and Telescope*, Sep., 1974.

* cited by examiner

Primary Examiner—Cassandra Spyrou
Assistant Examiner—Mark A. Robinson
(74) Attorney, Agent, or Firm—Van Dyke, Gardner, Linn & Buckhart, LLP

(57) ABSTRACT

A temperature compensating focuser and method for use, with a telescope includes providing a temperature sensor adapted to measuring temperature at the telescope body, a lens support for one of the focus optics and a control. The control includes a motor adjusting the support to modify a distance between the focus optics of the telescope in response to changes in temperature sensed by the temperature sensor. The control may further include a learning mode for establishing a temperature coefficient of the telescope. The control may further include a memory for storing a relative position of the lens support and a temperature value when power is removed from the control. The control adjusts the lens support according to the relative position and temperature values in memory and temperature sensed by the temperature sensor when power is restored to the control.

54 Claims, 7 Drawing Sheets

TEMPERATURE COMPENSATING FOCUSER FOR TELESCOPE

BACKGROUND OF THE INVENTION

This invention relates generally to a focuser for controlling the focus of a telescope and, more particularly, to a temperature compensating focuser compensating for changes in ambient temperature.

Particular telescope configurations, such as the Cassegrain configuration, which include primary and secondary mirrors, are susceptible to temperature drift effect on the back focuser. It is not uncommon to experience up to a 0.010-inch temperature drift for each 0° C. in temperature change. Because telescopes are used during nighttime hours when temperature changes are often extensive, it is possible for the telescope to experience significant focus drift especially during long exposure periods. It is not unusual during an observation session, for the ambient temperature to change by at least 10° C. within the time span of a few hours. Applications which require exact focus, such as CCD imaging or film astrophotography, typically also frequently require long exposure periods. By way of example, a typical RGB exposure sequence can last one hour. The change in focus due to the temperature is a serious problem for these telescopes resulting in frequent focusing before exposures and bloated stars during long exposures.

Although Cassegrain-type telescopes are exceptionally sensitive to temperature drift, other telescopes would exhibit such drift to a greater or lesser extent.

SUMMARY OF THE INVENTION

The present invention provides a temperature compensating focuser and method for use with a telescope having a focus which changes with ambient temperature. In particular, the invention is useful with a telescope having a body supporting a primary focus optic and a secondary focus optic which define a focus and wherein the body changes relative spacing of the focus optics with changes in ambient temperature.

A temperature compensating focuser, according to an aspect of the invention, includes a lens support establishing a focus of the telescope and a temperature sensor. The focuser further includes a control that is responsive to the temperature sensor for adjusting the lens support in response to changes in temperature sensed by the temperature sensor.

A temperature compensating focuser and method, according to another aspect of the invention, includes a temperature sensor adapted to measuring temperature at the telescope body and a support for one of the focus optics. A motor is provided for adjusting the support to modify a distance between the focus optics. A control is provided which receives input from the temperature sensor and produces an output to the motor to maintain the distance between the focus optics, notwithstanding changes in temperature at the telescope body.

A temperature compensating focuser, according to another aspect of the invention, includes a temperature sensor adapted to measuring the temperature at the telescope body and a support for one of the focus optics. A motor is provided for adjusting the support to modify the distance between the focus optics. A control is provided which receives an input from the temperature sensor and produces an output to the motor. The control has a learning mode to establish a temperature coefficient of the telescope. The control further includes a control mode to adjust the motor in response to the temperature sensor and a temperature coefficient determined during the learning mode.

According to yet another aspect of the invention, a temperature compensating focuser includes a temperature sensor measuring temperature at the telescope body and a support for one of the focus optics which is moveable with respect to a base. A motor adjusts the support to modify the distance between the focus optics. A control is provided which receives an input from the temperature sensor and produces an output to the motor. The control establishes a relative position of the support with respect to the base and includes a memory for storing a relative position of the support and a temperature value sensed by the temperature sensor when power is removed from the control. The controls adjust the support according to relative position and temperature values and memory and temperature sensed by the temperature sensor when power is restored to the controller.

A method of compensating the focus of a telescope includes providing a lens support establishing a focus of the telescope, sensing ambient temperature and adjusting the lens support in response to change in sensed ambient temperature.

A method of compensating the focus of a telescope, according to another aspect of the invention, includes measuring temperature at the telescope body, adjustably supporting one of the focus optics in a manner that a distance between the focus optics can be adjusted. The method further includes maintaining the distance between the focus optics notwithstanding changes in temperature at the telescope body.

A method of compensating the focus of a telescope, according to another aspect of the invention, includes measuring temperature at the telescope body and adjustably supporting one of the focus optics in a manner that a distance between the focus optics can be adjusted. The method further includes establishing a temperature coefficient of the telescope in a first mode and adjusting the distance between the focus optics during a second mode. According to this aspect of the invention, the adjusting is in response to the temperature at the telescope body and a temperature coefficient determined during the first mode.

A method of compensating the focuser of a telescope, according to yet another aspect of the invention, includes measuring temperature at the telescope body and adjustably supporting one of the focus objects in a manner that a distance between the focus objects can be adjusted. The method further includes establishing a distance value between the focus objects that corresponds to a temperature value at the telescope body. The method further includes storing the distance value and the corresponding temperature value and adjusting the distance between the focus objects according to the stored distance value and temperature and a current temperature at the telescope body.

Although the present invention is illustrated in use with a Cassegrain-type telescope, it should be understood that its principles may be applied to other telescope configurations that exhibit temperature drift. The present invention may be built into the overall structure of the telescope or, advantageously, provided as a field installable add-on kit to existing telescopes.

These and other objects, advantages and features of this invention will become apparent upon review of the following specification in conjunction with the drawings.

DESCRIPTION OF THE PREFERRED EMBODIMENT

Figure 1:
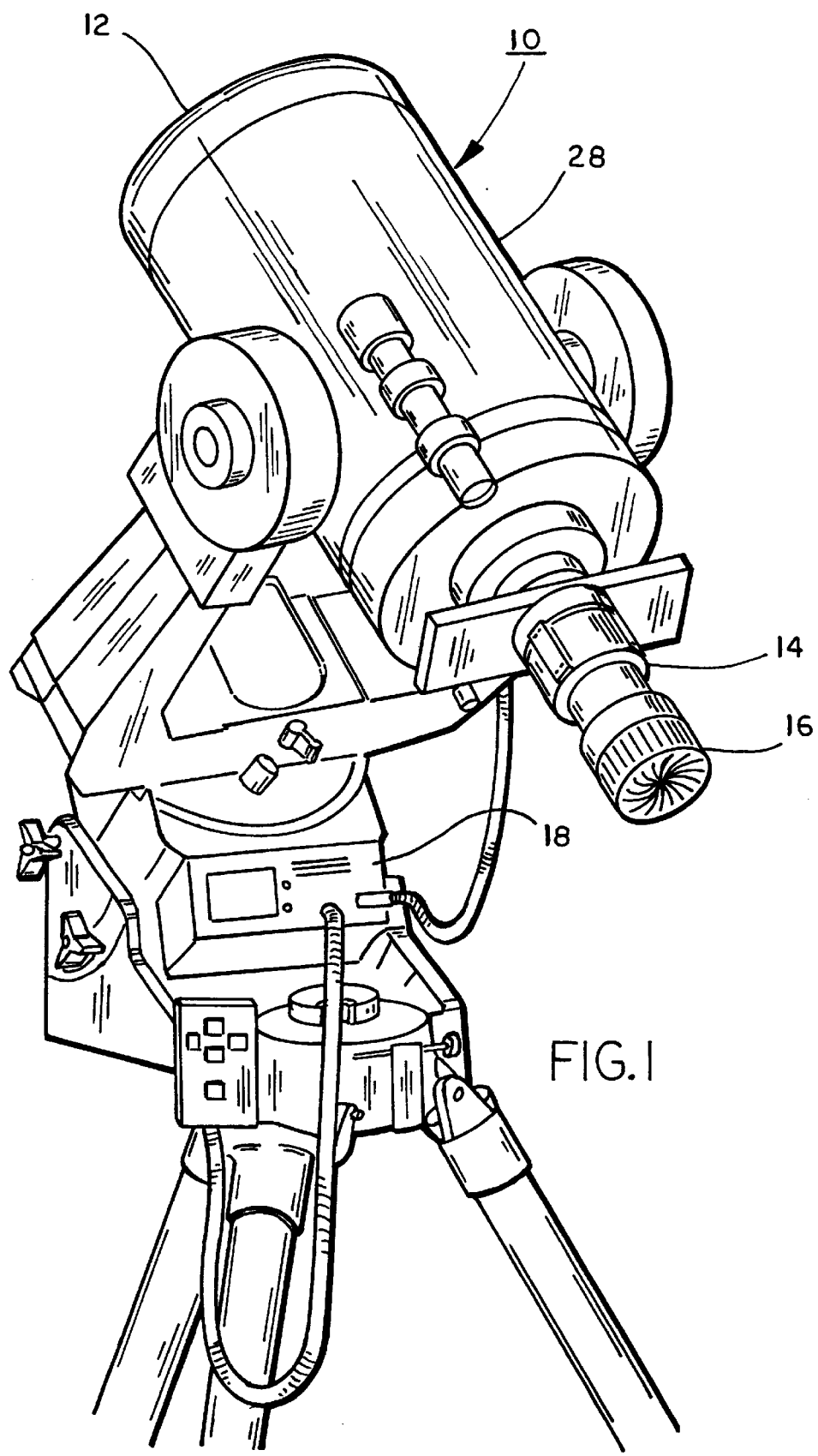
FIG. 1 is a perspective view of a Cassegrain configuration telescope including a temperature compensating focuser, according to the invention.

Referring now specifically to the drawings, and the illustrative embodiments depicted therein, a telescope assembly 10 includes a telescope 12 and a temperature compensating focuser 14 (FIG. 1). Telescope 12 is a conventional telescope, such as a Cassegrain configuration, having a body which supports a primary optic (not shown). Telescope 12 may be of any configuration. Temperature compensating focuser 14 supports a secondary optic 16 which, in combination with the primary optic, produces an image that may be focused, for example, on a CCD camera. Temperature compensating focus 14 can be used with other imaging devices, such as film and astrophotography, as well as for manual observation. As is conventional, telescope 12 includes a computer control 18 for controlling the position of the telescope.

Figure 2:
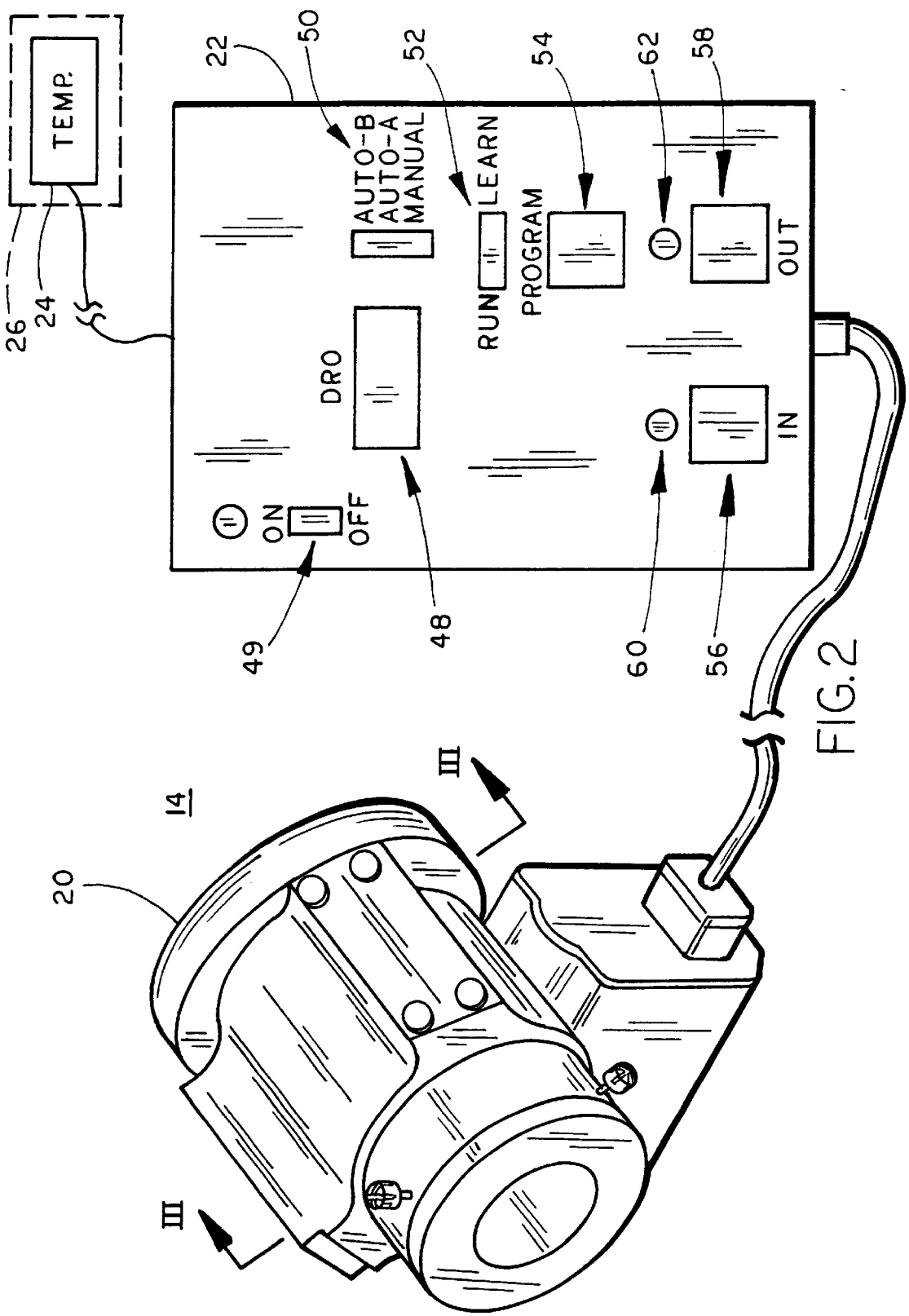
FIG. 2 is a perspective view of a temperature compensating focuser, according to the invention.
Figure 3:
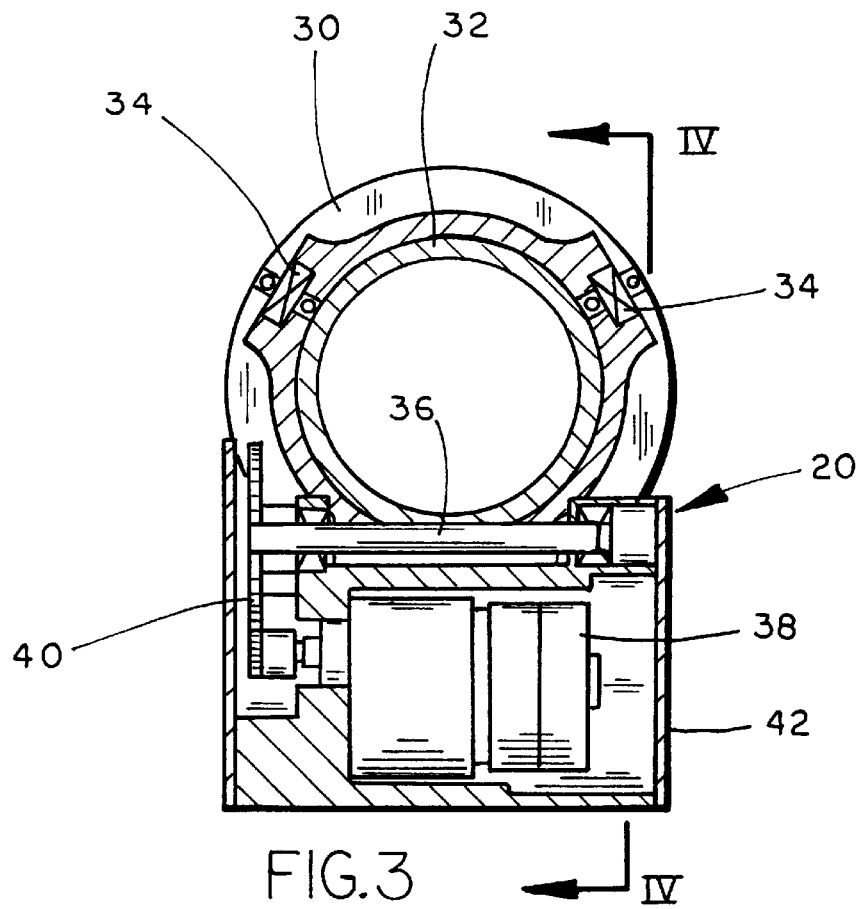
FIG. 3 is a sectional view taken along the lines III—III in FIG. 2.
Figure 5:
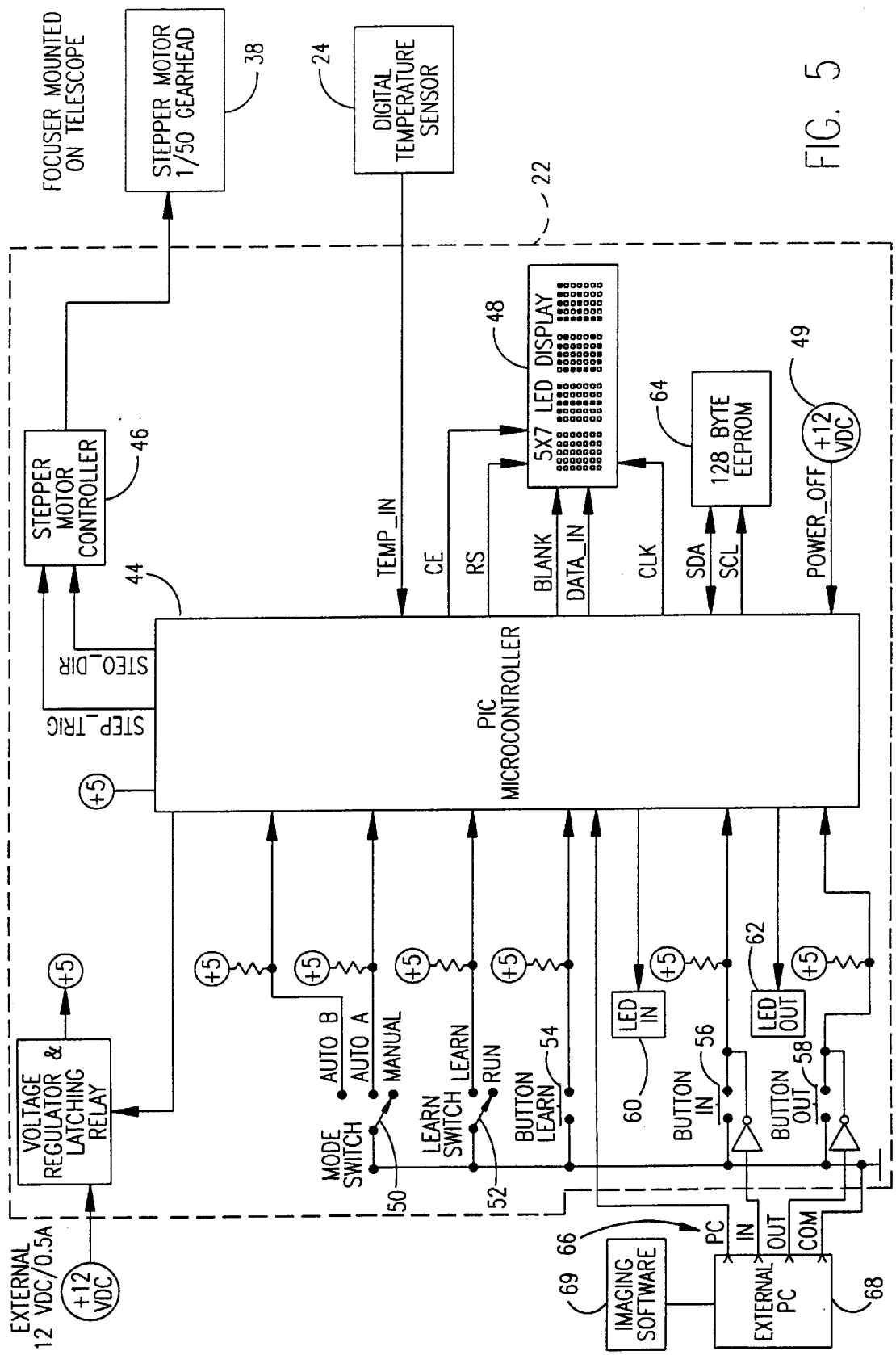
FIG. 5 is a block diagram of an electronic control.
Figure 6A:
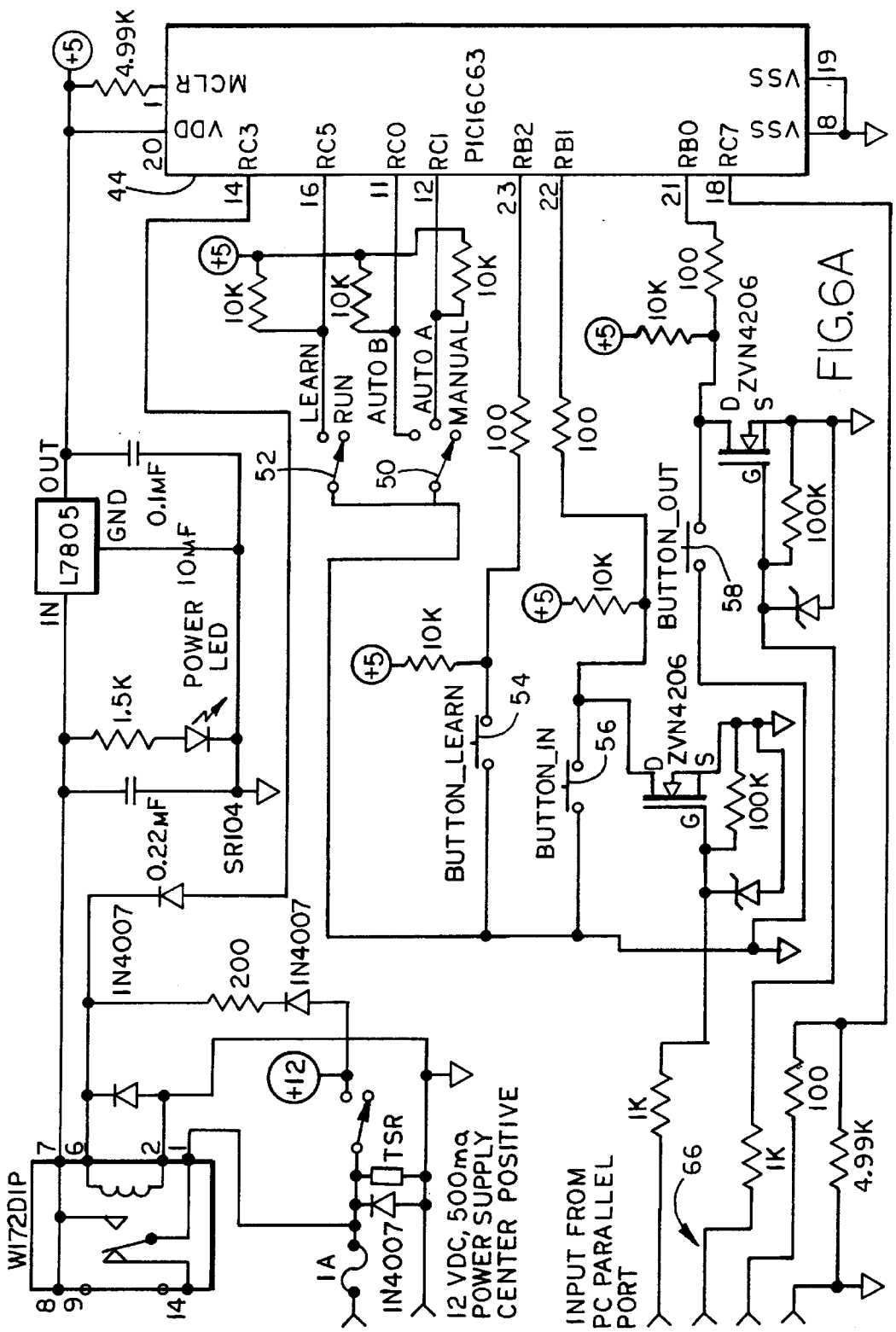
FIGS. 6a and 6b is a schematic diagram of the electronic control in FIG. 5.
Figure 6B:
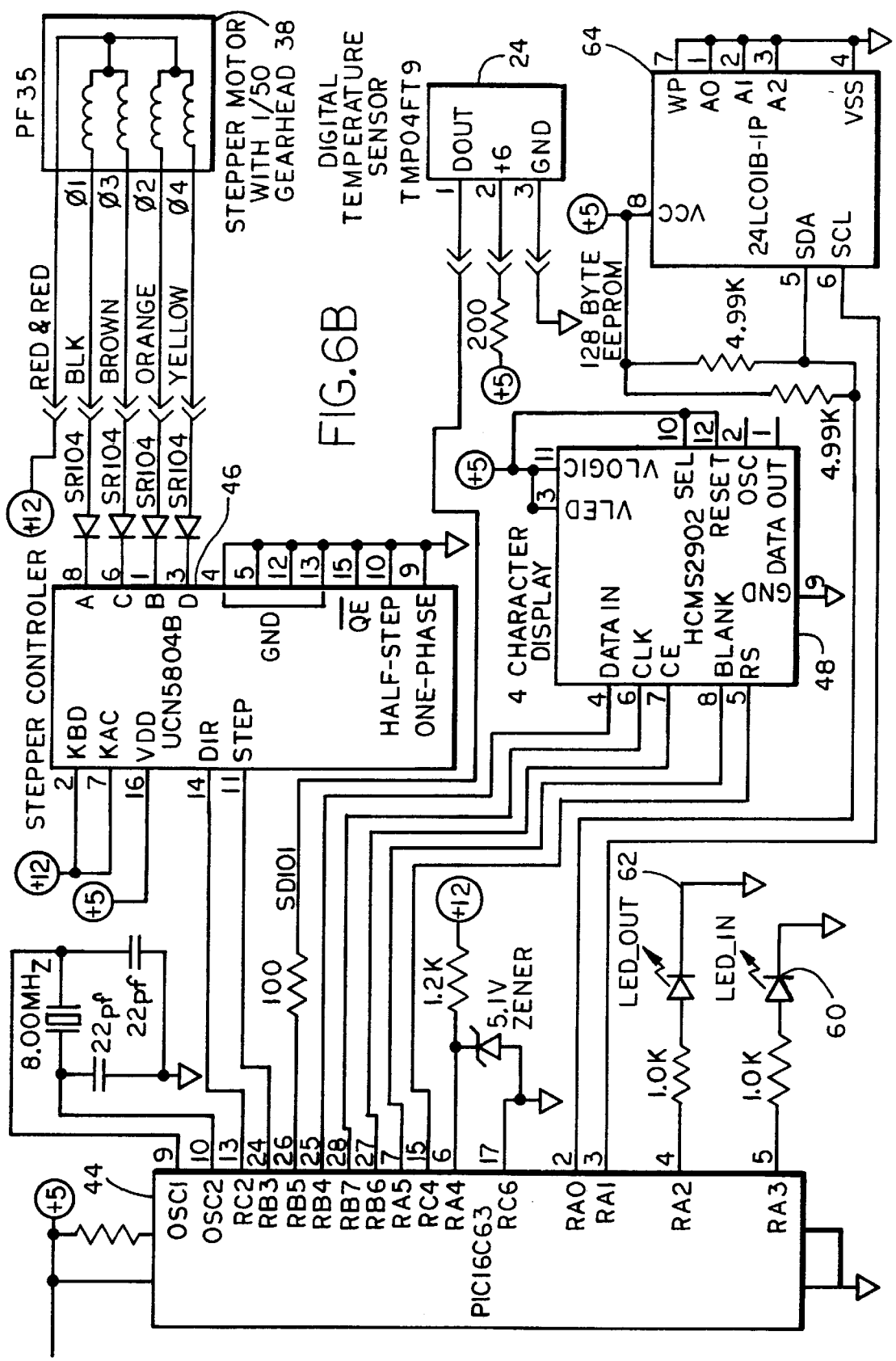
Figure 7:
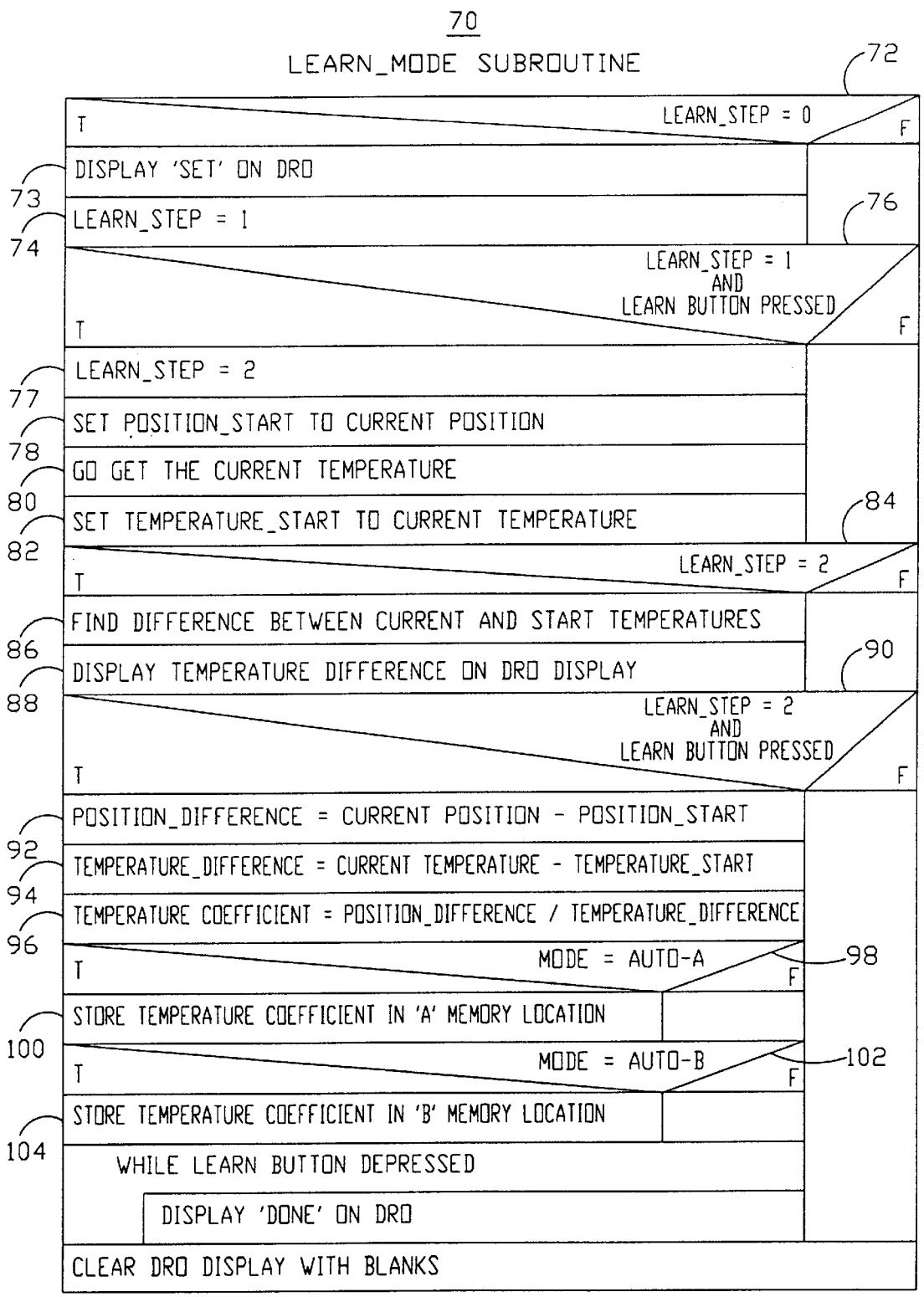
FIG. 7 is a flowchart of a learn-mode subroutine.

Temperature compensating focuser 14 includes a lens support 20, an electronic control 22 and a temperature sensor 24 (FIGS. 2 and 5). In the illustrated embodiment, temperature sensor 24 is a digital temperature sensor of the type produced by Analog Devices which produce a modulated waveform. However, an analog temperature sensor may, alternatively, be utilized. In the illustrated embodiment, temperature sensor 24 is mounted to a temperature buffer 26 which prevents rapid temperature fluctuations from affecting temperature sensor 24. In the illustrated embodiment, temperature buffer 26 is a foam pad with adhesive backing which adheres to the body 28 of the telescope. Preferably, the temperature buffer is a ¼-inch foam pad. Alternatively, temperature sensor 24 could be mounted in a hole drilled in body 28, especially if the temperature compensating focuser is permanently mounted to the telescope.

Figure 4:
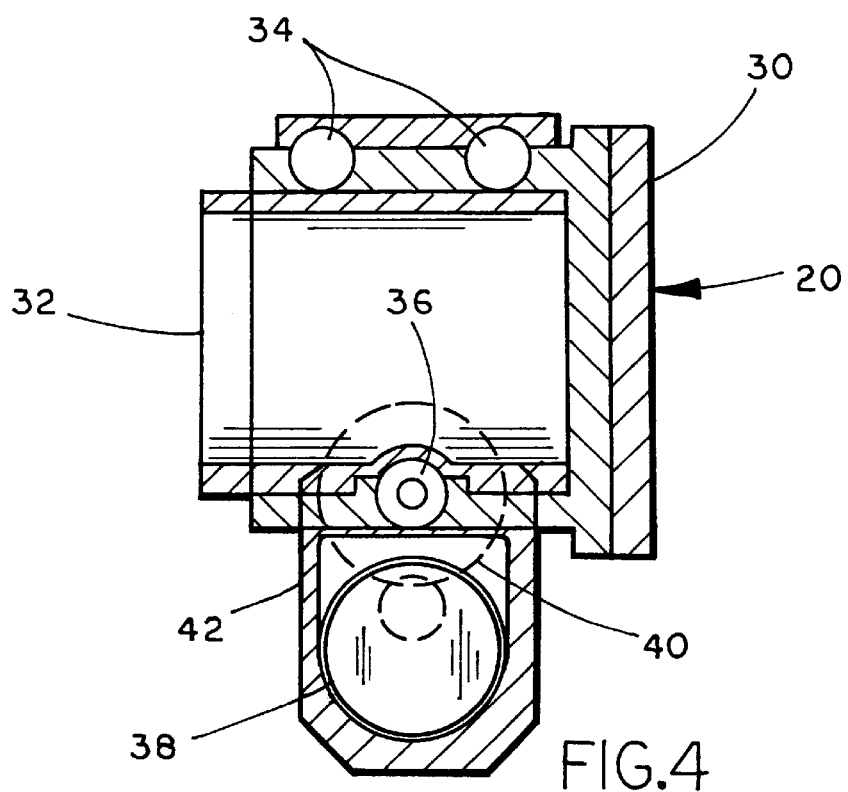
FIG. 4 is a sectional view taken along the lines IV—IV in FIG. 3.

Lens support 20 includes a base 30 and a draw tube 32 that is guided in and out with respect to base 30 on a set of roller bearings 34 and a shaft 36 which is frictionally coupled to draw tube 32. Lens support 20, as previously described, utilizes many of the principles of a Crayford focuser, which is conventionally used to adjust the position of the secondary optic with respect to the primary optic to focus a telescope. Shaft 36 is driven by a motor 38 which, in the illustrated embodiment, is a stepper motor. However, other types of motors, such as synchronous motors, motors with encoders, and the like, may be utilized. Motor 38 drives shaft 36 through a gear set 40 which has a gear reduction of 50:1. In the illustrated embodiment, each step from motor 28 moves draw tube 32 0.000085 inches. The motor and drive gears are protected in a motor housing 42. Draw tube 32 moves a total distance of 0.6 inches with respect to base 30. Draw tube 32 has a home position, illustrated in FIG. 4, at which motor 38 will stall when the draw tube reaches that position. When draw tube 32 reaches the home position, the control 22 sets the zero, or home, position at that point.

Electronic control 22 includes a microcontroller 44 which supplies outputs to a stepper motor controller 46 which, in turn, supplies signals to drive stepper motor 38. Microcontroller 44 also supplies outputs to a display 48 and receives inputs from a mode switch 50, a learn switch 52 and a learn button 54. Microcontroller 44 additionally receives inputs from an IN button 56 and an OUT button 58. Microcontroller 44 also supplies outputs to an IN indicator 60 and an OUT indicator 62. Microcontroller 44 additionally exchanges data with an erasable programmable memory (EEPROM) 64. Microcontroller 44 additionally receives inputs from an external PC input 66. In the illustrated embodiment, microcontroller 44 is a microcomputer-based processor marketed by PIC Microchip under Model PIC16C63. A computer program for the microcontroller is written in the Basic language and compiled to the code for that microcontroller.

When mode switch 50 is set to the Manual mode, depressing of button 56 will cause controller 44 to issue commands to move the draw tube 32 in one direction while actuating of OUT button 58 will cause the controller to issue commands to move the draw tube in the opposite direction. This provides manual focusing of the telescope lens by operating buttons 56, 58, while the operator views the image observed by the telescope until the image is perceived to be in focus. Alternatively, manual focus may be determined by taking multiple exposures with a camera as would be apparent to the skilled artisan. Display 48 displays the position of draw tube 32 with respect to its home position. In the illustrated embodiment, each step displayed by display 48 represents relative position of draw tube 32 in increments of 0.000085 of an inch.

Temperature compensating focuser 14 includes the ability to determine a temperature coefficient for the telescope 12 that the focuser is combined with. This is accomplished by placing learn switch 52 in the learn mode and placing the mode switch in the mode A or B that it is desired to calculate a temperature coefficient for. After the switches are placed to the appropriate mode, the telescope is focused and a significant change in temperature is awaited. In the illustrated embodiment, a temperature change of at least approximately 5° C. is chosen, although other temperature differences may be utilized. The greater the change in temperature, the more accurate the calculation of the temperature coefficient. After the temperature change, the telescope is then, again, focused utilizing buttons 56, 58. The learn button 54 is then actuated. Microcontroller 44 calculates a temperature coefficient as the linear slope between the two positions of the draw tube and the two measured temperatures corresponding to those points. The linear slope establishes the change in length of the separation between the primary and secondary optics resulting from expansion of body 28 for each degree C. change of temperature at body 28. Advantageously, temperature compensating focus 14 allows two such temperature coefficients to be determined. This allows the device to be moved from one telescope to the other or to be used with different setups for the same telescope. However, the invention comprehends that only one temperature coefficient could be determined or more than two temperature coefficients could be determined according to the particular application.

Once a temperature coefficient is determined, the user can set up the telescope and establish a focus as previously described. The learn switch 52 is then placed to the run position and the mode switch is placed to the auto-A or auto-B position depending upon the location at which the corresponding temperature coefficient is stored. Temperature compensating focuser 14 will then adjust the position of draw tube 32 according to the changes in ambient temperature as measured by temperature sensor 24 and utilizing the previously determined temperature coefficient.

A routine 70 for determining a temperature coefficient begins at 72 by determining that the learn-step parameter is set to 0 and at 72 that the digital readout unit is actuated at 73. The learn-step parameter is set to 1 at 74 and it is determined at 76 whether the learn-step parameter is set to 1 and that the learn button 54 is actuated. If so, then the learn-step parameter is set to 2 at 77 and the position-start parameter is set to the current position of the draw tube at 78. The value of the current temperature is retrieved at 80 and the temperature-start parameter is set to the current temperature at 82.

After it is confirmed at 84 that the learn-step parameter is set to 2, the routine determines at 86 the difference between the current temperature and the temperature-start parameter. The temperature difference is displayed at 88 on the digital readout display 48.

It is then determined at 90 whether the learn button 54 is actuated. If so, then the difference between the current position of the draw tube and the start position of the draw tube is determined at 92. The temperature difference between the current temperature and the start-temperature is determined at 94. A temperature coefficient is determined at 96 at the difference in position divided by the difference in temperature.

If it is determined at 98 that mode switch 50 is set to auto-A, then the calculated temperature coefficient is stored at 100 in the A memory location. If it is determined at 102 that the mode switch 50 is in the auto-B position, then the calculated temperature coefficient is stored at 104 in the memory B location. The temperature coefficient is ready for use in adjusting draw tube 32 in response to changes in the temperature at body 28 as sensed by temperature sensor 24.

When a power switch 49 for control 22 is placed in the OFF position, there is a momentary delay as the microcontroller 44 writes the current position and temperature of temperature compensating focuser 14 to memory 64. When power switch 49 is turned to the ON position, the microcontroller drives the draw tube 32 to the home position and retrieves the last position and last temperature before it is shut down from the memory 64. The focuser will then go to that position taking into account the difference between the last temperature and the current temperature. This feature allows the temperature compensating focuser to be powered down when not in use and powered up, without the necessity to refocus the telescope, and taking into account the temperature of the telescope when the unit is powered up.

External computer input 66 provides an interface with a computer such as an IBM-compatible personal computer. Input 66 includes four lines: an IN line, an OUT line, a PC line and a COM line. When the IN line is actuated, the effect is the same as operating push button 56. When the OUT line is actuated, the effect is the same as operating push button 58. This allows a computer 68 to focus the lens support by supplying pulses to electronic control 22 that are the equivalent of operation of the IN or OUT push buttons 56, 58. Alternatively, the computer may operate the electronic control by supplying a pulse between the PC input and the COM input. Microcontroller 44 will respond to the width of the pulse by making adjustments to the position of the draw tube that are proportional to the width of the pulse. The PC would, concurrently, actuate either the IN or OUT inputs in order to indicate to the microcontroller the direction that the signal on the PC input is intended to effect. This second mode offers greater versatility and control of the temperature compensating focuser.

Operation of the external PC input is best understood by considering an IBM PC-compatible computer 68, such as one having a Pentium processor, or better, connected with external PC input 66. The personal computer is preferably programmed with imaging software 69, such as the MAXIM DL 2.0 CCD imaging software from Cyanogen Productions, Inc. Such imaging software has the capability to determine whether the captured image is in focus by evaluating the centroid of the image. Utilizing such imaging software, the personal computer can issue appropriate commands to external PC input 66 in order to adjust the position of the draw tube in order to thereby move the secondary mirror with respect to the primary mirror. When the imaging software obtains a best fit focus, adjustments of draw tube 32 to compensate for changes in ambient temperature are carried out in a manner previously described.

The present invention provides the ability to compensate for changes to the focus of a telescope, or other instrument, based upon changes in ambient temperature without the necessity for complex algorithms to calculate the focus of the telescope. This is accomplished because the temperature compensating focuser only determines the change in focus created by the change in temperature and does not require knowledge of the actual focus per se. The present invention provides a convenient and rugged technique for compensating for temperature changes to the focus of telescopes of a wide range of designs including homemade telescopes, amateur telescopes and high-quality professional telescopes. Furthermore, the present invention may be provided as a field-installed unit and thereby be capable of movement from one telescope to another telescope. This aspect is enhanced by the ability to calculate and store multiple temperature coefficients. Furthermore, the present invention provides a unique shutdown mode wherein, upon power-up, the focus of the telescope is re-established without the necessity for intervention and taking into account the ambient temperature at the time of power-up.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A temperature compensating focuser for use with a telescope having a body supporting a primary focus optic and a secondary focus optic which define a focus and wherein said body changes relative spacing of said focus optics with changes in ambient temperature, said temperature compensating focuser comprising:

a temperature sensor adapted to measuring temperature at the telescope body;

a support for one of the focus optics;

a motor adjusting said support to modify a distance between the focus optics; and a control which receives an input from said temperature sensor and produces an output to said motor to maintain the distance between the focus optics notwithstanding changes in temperature at the telescope body, wherein said control is operable to determine a temperature coefficient of the telescope.

2. The temperature compensating focuser in claim 1 wherein said support includes a home position and said control determines a position of said support by operating said support to the home position.

3. The temperature compensating focuser in claim 2 wherein said comprises a stepper motor.

4. The temperature compensating focuser in claim 2 wherein said control includes inputs for adjusting said motor.

5. The temperature compensating focuser in claim 4 wherein said inputs include electronically operable inputs to focus the telescope from an external source.

6. The temperature compensating focuser in claim 5 including a computer programmed with imaging software operating said electronically operable inputs.

7. The temperature compensating in claim 1 wherein said control includes inputs for adjusting said motor.

8. The temperature compensating in claim 7 wherein said inputs include manual inputs allowing a user to manually focus the telescope.

9. The temperature compensating focuser in claim 7 wherein said inputs are operable to determine a temperature coefficient of the telescope.

10. A temperature compensating focuser for use with a telescope having a body supporting a primary focus optic and a secondary focus optic which define a focus and wherein said body changes relative spacing of said focus optics with changes in ambient temperature according to a temperature coefficient, said temperature compensating focuser comprising:
   a temperature sensor adapted to measuring temperature at the telescope body;
   a support for one of the focus optics;
   a motor adjusting said support to modify a distance between the focus optics;
   a control which receives an input from said temperature sensor and produces an output to said motor, said control having a learning mode and a control mode, wherein said learning mode establishes a temperature coefficient of the telescope and wherein said control mode adjusts said motor in response to said temperature sensor and a temperature coefficient determined during said learning mode.

11. The temperature compensating focuser in claim 10 including a memory for storing a temperature coefficient determined during said learning mode.

12. The temperature compensating focuser in claim 11 wherein said control is adapted to store multiple temperature coefficients in said memory.

13. The temperature compensating focuser in claim 10 wherein said control establishes a temperature coefficient of the telescope during said learning mode by comparing positions of said support in which the telescope is in focus for at least two distinctive values of ambient temperature sensed by said temperature sensor.

14. The temperature compensating focuser in claim 10 wherein said control includes inputs for adjusting said motor.

15. The temperature compensating focuser in claim 14 wherein said inputs include manual inputs allowing a user to manually focus the telescope.

16. The temperature compensating focuser in claim 14 wherein said inputs include electronically operable inputs to focus the telescope from an external source.

17. The temperature compensating focuser in claim 16 including a computer programmed with imaging software operating said electronically operable inputs.

18. The temperature compensating focuser in claim 14 wherein said inputs are operable to determine a temperature coefficient of the telescope.

19. A temperature compensating focuser for use with a telescope having a body supporting a primary focus optic and a secondary focus optic which define a focus and wherein said body changes relative spacing of said focus optics with changes in ambient temperature, said temperature compensating focuser comprising:
   a temperature sensor measuring temperature at the telescope body;
   a support for one of the focus optics, said support moveable with respect to a base;
   a motor adjusting said support to modify a distance between the focus optics; and
   a control which receives an input from said temperature sensor and produces an output to said motor, said control establishing a relative position of said support with respect to said base and including a memory for storing a relative position of said support and a temperature value sensed by said temperature sensor when said control is deactivated, said control adjusting said support according to relative position and temperature values in said memory and temperature sensed by said temperature sensor when said control is reactivated.

20. The temperature compensating focuser in claim 19 wherein said support includes a home position and said control determines a position of said support by operating said support to the home position.

21. The temperature compensating focuser in claim 19 wherein said motor comprises a stepper motor.

22. The temperature compensating focuser in claim 19 wherein said control includes inputs for adjusting said motor.

23. The temperature compensating focuser in claim 22 wherein said inputs include manual inputs allowing a user to manually focus the telescope.

24. The temperature compensating focuser in claim 22 wherein said inputs include electronically operable inputs to focus the telescope from an external source.

25. The temperature compensating focuser in claim 24 including a computer programmed with imaging software operating said electronically operable in inputs.

26. The temperature compensating focuser in claim 19 wherein said control is operable to determine a temperature coefficient of the telescope.

27. The temperature compensating focuser in claim 26 wherein said control includes inputs for adjusting said motor.

28. The temperature compensating focuser in claim 27 wherein said inputs are operable to determine a temperature coefficient of the telescope.

29. A method of compensating the focus of a telescope having a body supporting a primary focus optic and a secondary focus optic which define a focus and wherein said body changes relative spacing of said focus optics with changes in ambient temperature, comprising:
   measuring temperature at the telescope body;
   adjustably supporting one of the focus optics in a manner that a distance between the focus optics can be adjusted; and
   maintaining the distance between the focus optics notwithstanding changes in temperature at the telescope body, including determining a temperature coefficient of the telescope.

30. The method of claim 29 wherein said adjustably supporting includes providing a support for the one of the focus optics and a motor and further including adjusting said support with said motor.

31. The method of claim 30 wherein said support includes a home position and including determining a position of said support by adjusting said support to the home position.

32. The method of claim 30 wherein said motor comprises a stepper motor.

33. The method of claim 30 wherein said adjusting includes providing inputs to said motor.

34. The method of claim 33 wherein said providing inputs includes receiving from a user manual inputs to manually focus the telescope.

35. The method of claim 33 wherein said providing inputs includes receiving electronically operable inputs to focus the telescope from an external source.

36. The method of claim 35 wherein said receiving electronically operable inputs includes providing a computer programmed with imaging software and operating said electronically operable inputs with said computer.

37. A method of compensating the focus of a telescope having a body supporting a primary focus optic and a secondary focus optic which define a focus and wherein said body changes relative spacing of said focus optics with changes in ambient temperature, comprising:

measuring temperature at the telescope body;

adjustably supporting one of the focus optics in a manner that a distance between the focus optics can be adjusted; and establishing a temperature coefficient of the telescope in a first mode and adjusting the distance between the focus optics during a second mode, said adjusting in response to the temperature at the telescope body and a temperature coefficient determined during said first mode.

38. The method of claim 37 wherein said adjustably supporting includes providing a support for the one of the focus optics and a motor and further including adjusting said support with said motor.

39. The method of claim 38 wherein said support includes a home position and including determining a position of said support by adjusting said support to the home position.

40. The method of claim 38 wherein said motor comprises a stepper motor.

41. The method of claim 38 wherein said adjusting includes providing inputs to said motor.

42. The method of claim 41 wherein said providing inputs includes receiving from a user manual inputs to manually focus the telescope.

43. The method of claim 41 wherein said providing inputs includes receiving electronically operable inputs to focus the telescope from an external source.

44. The method of claim 43 wherein said receiving electronically operable inputs includes providing a computer programmed with imaging software and operating said electronically operable inputs with said computer.

45. A method of compensating the focus of a telescope having a body supporting a primary focus optic and a secondary focus optic which define a focus and wherein said body changes relative spacing of said focus optics with changes in ambient temperature, comprising:

measuring temperature at the telescope body;

adjustably supporting one of the focus optics in a manner that a distance between the focus optics can be adjusted;

establishing a distance value between the focus optics that corresponds to a temperature value at the telescope body;

storing the distance value and the corresponding temperature value; and adjusting the distance between the focus optics according to the stored distance value and temperature value and current temperature at the telescope body.

46. The method of claim 45 including providing a control and storing the distance value and corresponding temperature value upon deactivating the control.

47. The method of claim 46 including adjusting the distance upon reactivating the control.

48. The method of claim 45 wherein said adjustably supporting includes providing a support for the one of the focus optics and a motor and further including adjusting said support with said motor.

49. The method of claim 48 wherein said support includes a home position and including determining a position of said support by operating said support to the home position.

50. The method of claim 48 wherein said motor comprises a stepper motor.

51. The method of claim 48 wherein said adjusting includes providing inputs to said motor.

52. The method of claim 51 wherein said providing inputs includes receiving from a user manual inputs to manually focus the telescope.

53. The method of claim 51 wherein said providing inputs includes receiving electronically operable inputs to focus the telescope from an external source.

54. The method of claim 53 wherein said receiving electronically operable inputs includes providing a computer programmed with imaging software and operating said electronically operable inputs with said computer.

* * * * *

UNITED STATES PATENT AND TRADEMARK OFFICE
CERTIFICATE OF CORRECTION

PATENT NO. : 6,327,081 B1
DATED : December 4, 2001
INVENTOR(S) : Gerald C. Persha It is certified that error appears in the above-identified patent and that said Letters Patent is hereby corrected as shown below:

<u>Title page,</u>
Item [57], ABSTRACT,
Line 1, delete "," after "use"

<u>Column 3,</u>
Line 8, "is" should be -- are --

<u>Column 7,</u>
Line 2, insert -- motor -- after "said"
Lines 12 and 14, insert -- focuser -- after "compensating"

<u>Column 8,</u>
Line 38, delete "in" after "operable"

Signed and Sealed this

Fifteenth Day of April, 2003

JAMES E. ROGAN
*Director of the United States Patent and Trademark Office*